United States Patent [19]
Henson et al.

[11] Patent Number: 5,325,455
[45] Date of Patent: Jun. 28, 1994

[54] FIBER OPTIC EDGE CARD CONNECTOR

[75] Inventors: Gordon D. Henson, Lake Elmo; Nicholas A. Lee, Woodbury; Anthony J. Piekarczyk, Fridley, all of Minn.

[73] Assignee: Minnesota Mining and Manufacturing Company, St. Paul, Minn.

[21] Appl. No.: 964,913

[22] Filed: Oct. 21, 1992

[51] Int. Cl.⁵ .............................................. G02B 6/26
[52] U.S. Cl. .................................... 385/89; 385/88; 385/76; 385/78; 385/137; 385/139
[58] Field of Search ................... 385/53, 55, 60, 70, 385/76, 78, 88, 89, 90, 91, 92, 94, 52, 137, 138, 139; 250/227.11

[56] References Cited

U.S. PATENT DOCUMENTS

| | | | |
|---|---|---|---|
| 4,611,887 | 9/1986 | Glover et al. | 385/88 X |
| 4,678,264 | 7/1987 | Bowen et al. | 385/88 X |
| 4,762,388 | 8/1988 | Tamaka et al. | 385/88 X |
| 4,779,950 | 10/1988 | Williams | 385/88 X |
| 4,807,955 | 2/1989 | Ashman et al. | 385/88 X |
| 4,840,451 | 6/1989 | Sampson et al. | 385/89 X |
| 4,877,302 | 10/1989 | Schürmann et al. | 385/56 X |
| 4,944,568 | 7/1990 | Danbach et al. | 385/88 X |
| 4,979,792 | 12/1990 | Weber et al. | 385/88 X |
| 4,986,762 | 1/1991 | Keith | 439/131 |
| 5,013,247 | 5/1991 | Watson | 385/56 X |
| 5,016,968 | 5/1991 | Hammond et al. | 385/88 X |
| 5,104,243 | 4/1992 | Harding | 385/89 X |
| 5,155,784 | 10/1992 | Knott | 385/88 |
| 5,166,995 | 11/1992 | Briggs et al. | 385/58 |
| 5,199,093 | 3/1993 | Longhurst | 385/49 X |
| 5,204,925 | 4/1993 | Bonanni et al. | 385/89 |
| 5,230,030 | 7/1993 | Hartman et al. | 385/89 X |
| 5,239,606 | 8/1993 | Shibutani et al. | 385/89 |
| 5,241,614 | 8/1993 | Ecker et al. | 385/89 X |

*Primary Examiner*—Brian Healy
*Attorney, Agent, or Firm*—Gary L. Griswold; Walter N. Kirn; Jack V. Musgrove

[57] ABSTRACT

A fiber optic connector for coupling an optical fiber to an optoelectronic component mounted near the edge of a circuit card. The connector includes a housing, a frame and a plug. The housing is mounted to the circuit card and contains the optoelectronic components. The front edge of the housing, which is flush with the edge of the circuit card, has an alignment block with a plurality of holes therein. The frame is attached to a support bar adjacent the edge of the circuit card. The plug, which has several ferrules each containing the terminal end of an optical fiber, is received by the frame and the ferrules are thereby aligned with the holes in the housing. A tongue-and-groove arrangement may be used to align the plug with the frame, and the plug is preferably polarized. A novel torsion member is used to releasably secure the plug in the frame at one of two positions, an operative position and a storage position. In one embodiment the connector is provided with a shuttle interposed between the housing and the frame. The shuttle maintains the proper orientation of a tip of an elongated actuator tool which is used to engage and disengage electrical connectors which are located on the same circuit card adjacent the fiber optic connector.

22 Claims, 7 Drawing Sheets

FIBER OPTIC EDGE CARD CONNECTOR

BACKGROUND OF THE INVENTION

1. Field of the Invention

The present invention generally relates to devices for interconnecting data transmission lines, and more particularly to a low profile connector for aligning optical fibers with optoelectronic components along the edge of a circuit board.

2. Description of the Prior Art

The use of optical fibers for high speed communication and data transmission via optical signals has become well established. There are already hundreds of thousands of miles of optical fiber in use today. As with copper wires, it is necessary to provide connections between optical fibers at various locations in the distribution system, whether during the installation of new fibers, or during the repair or replacement of existing fibers. It has, therefore, become imperative to provide optical fiber connectors which may be inexpensively manufactured, as well as easily assembled in the field or on customer premises, to provide connections between existing fibers and electro-optical (optoelectronic) devices. As used herein, the term "connector" refers to a detachable and refastenable device, as opposed to a "splice" which usually connotes a permanent connection.

There are several conventional optical fiber connector designs, including those commonly referred to as ST, SC, FC, D4, SMA, and biconic connectors. Each of these designs are simplex, i.e., they are used to connect a single pair of fibers, although they may be adapted for duplex use. Other connectors have been specifically designed for duplex connections, including those shown in U.S. Pat. Nos. 4,611,887, 4,762,388, 4,779,950, 4,979,792 and 5,016,968. The connector design shown in the latter two patents is referred to as FDDI, for Fiber Distributed Data Interface, and is probably the closest prior art to the present invention. This connector employs ferrule technology and is used, among other things, for data transmission and reception between computer systems, particularly local area networks. Another device known as an ESCON connector is very similar to the FDDI connector but additionally has a retractable shroud to protect the ferrules.

One need that has still not been met by FDDI and other fiber optic connectors is the demand for an efficient mass connection system for a high-density environment, particularly for a data processing system, such as a mainframe computer or a telecommunications switching system. A major problem is that conventional connectors are too large, both in overall bulk and more importantly in the ferrule-to-ferrule spacings. An alternative to ferrule technology is expanded beam technology, but this format is very costly. Most of the prior art designs further require numerous components, adding to cost which becomes very significant in a mass connection system.

There is also a need for an optical connector which physically cooperates with or conforms to a bank or array of connectors which may include side-by-side fiber and copper connections. For example, in some prior art computer systems, the connectors are designed to provide for the quick, mass disconnection of all of the connectors on a given circuit card, allowing removal of the card from the chassis of the computer. It would, therefore, be desirable and advantageous to devise a low-profile connector for providing a high-quality connection to optoelectronic components in a very high density interconnection environment. The connectors should be modular, and compatible with existing systems having copper connectors, and should further be adapted to easily provide fiber-to-fiber connections.

SUMMARY OF THE INVENTION

The present invention generally comprises a fiber optic edge card connector including a transceiver housing mounted to the edge of a card or circuit board, a frame located next to the transceiver housing, and a plug releasably attached to the frame, the plug having several ferrules. The housing contains optoelectronic components, such as a laser diode or photodetector, which are electrically connected to other electronic components mounted on the circuit board. The ferrules pass through holes in an alignment block at the edge of the housing, and are coupled to the optically active ends of the optoelectronic components. A bushing may be located in each of the holes to align the ferrules.

The plug may be provided with a rotatable latch member which engages different slots in the frame, allowing the plug to remain in the connector, but in a stored, inoperative position. A tongue-and-groove arrangement may be used to slidably attach the plug to the frame, and the plug may be mechanically polarized.

The connector is advantageously very slim, and has a close ferrule-to-ferrule spacing, to efficiently serve very high-density interconnection environments. In this application, the connectors may be stackable as well as closely spaced with overlapping mounting brackets. A sliding shuttle mechanism located in each connector may be used to complement one particular prior art system using a long actuator tool to engage or disengage edge-mounted copper connectors.

In another embodiment, the present invention may be used to interconnect pairs of optical fibers, by providing two plugs and a single receptacle having two ramps each of which is similar to the frame. The central portion of the receptacle has a block with ferrule-receiving holes. In this manner, plugs originally connected to the circuit card may easily be re-routed to other destinations.

BRIEF DESCRIPTION OF THE DRAWINGS

The novel features of the invention are set forth in the appended claims. The invention itself, however, will best be understood by reference to the accompanying drawings, wherein:

DESCRIPTION OF THE PREFERRED EMBODIMENTS

Figure 1:
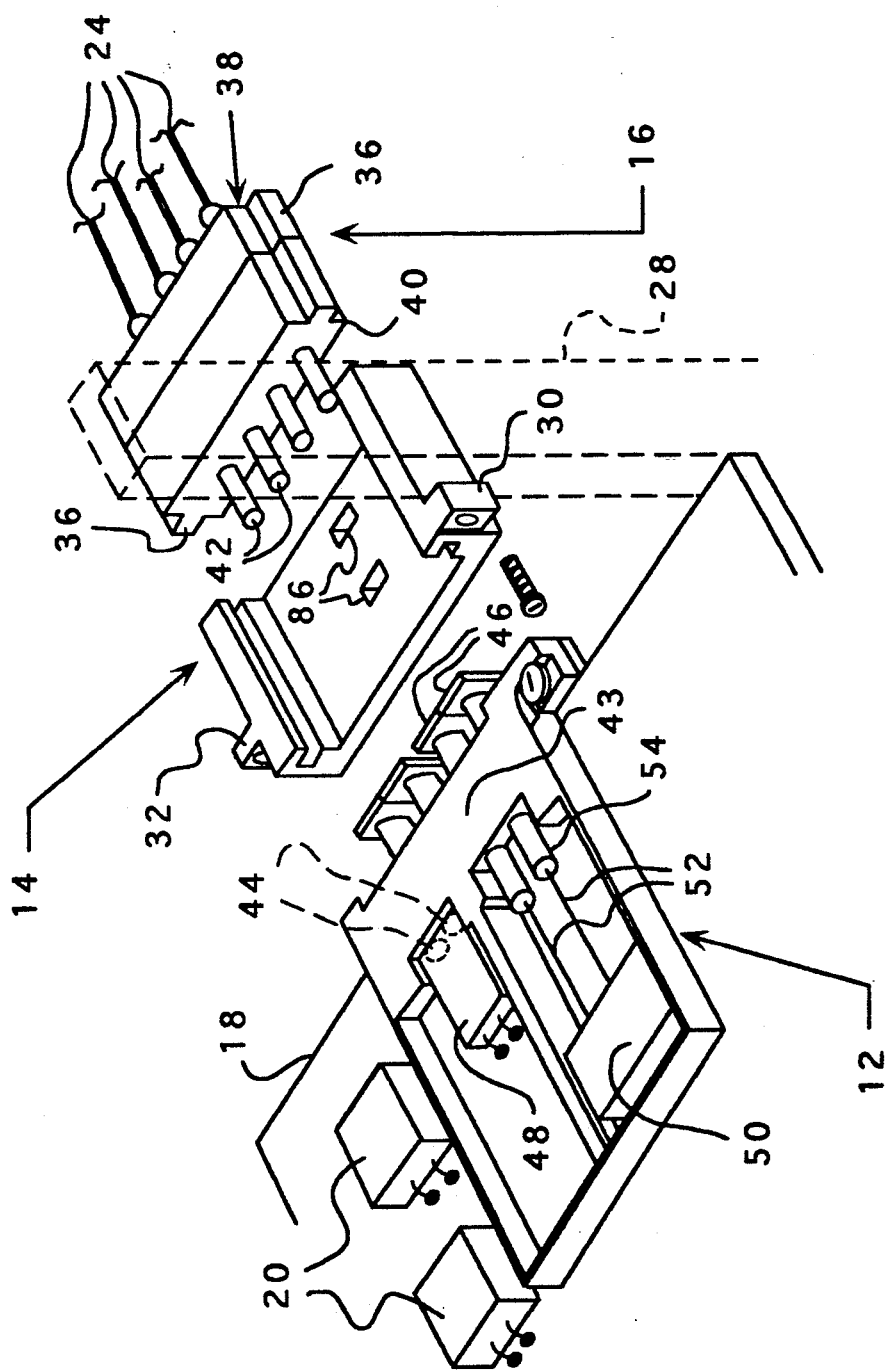
FIG. 1 is an exploded perspective view of the connector of the present invention depicting the transceiver housing mounted on a substrate.
Figure 2:
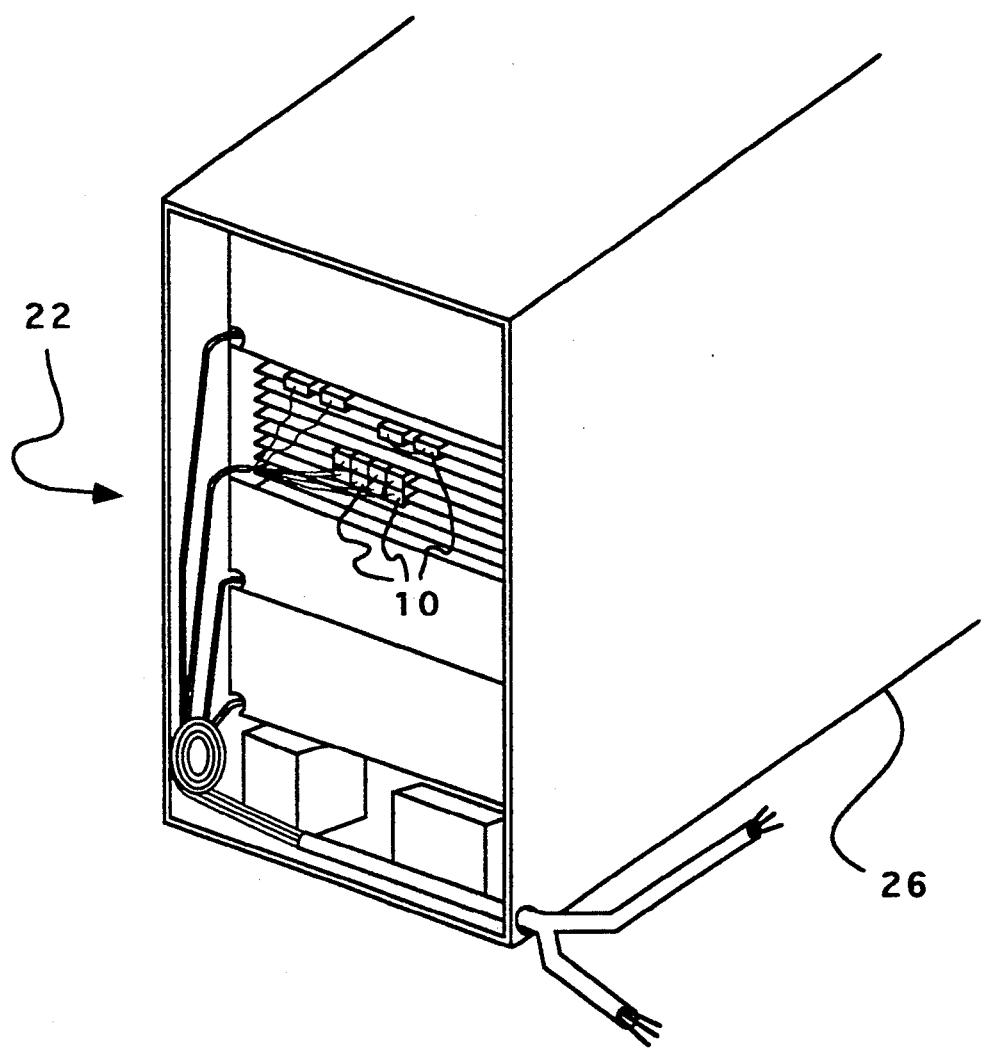
FIG. 2 is a perspective view of a data processing system having printed circuit boards or cards, and using optical fibers to interconnect the cards.

With reference now to the figures, and in particular with reference to FIG. 1, there is depicted the fiber optic card edge connector 10 of the present invention. In the embodiment depicted, connector 10 is generally comprised of a transceiver housing 12, a receptacle or mounting frame 14 and a plug 16. Transceiver housing 12 is supported by a substrate 18 such as a circuit card which also includes several electronic components 20. Substrate 18 may be a cooling plate which is attached to the circuit card. Connector 10 is particularly suited for use in a high-density interconnection environment, such as a mainframe computer 22 depicted in FIG. 2. The exemplary computer 22 has a plurality of circuit cards 18, several or all of which may have connectors 10 attached at the edges thereof. Cards 18 usually have many other copper edge card connectors, which are omitted from the drawings for clarity. The optical fibers 24 may be connected to other optoelectronic components on the same card or in the same panel, or the fibers may routed to other areas in the body 26 of computer 22, or completely exit body 26 and connect to peripheral or auxiliary devices.

Figure 8:
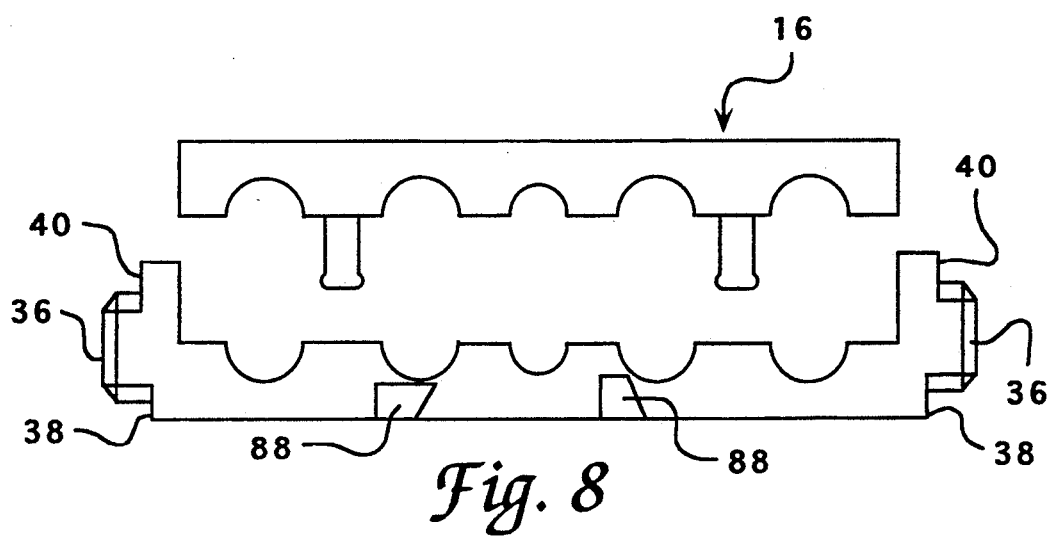
FIG. 8 is a front exploded view of one embodiment of the plug used in the present invention.

Returning to FIG. 1, frame 14, may be integrally formed with housing 12 or removably attached thereto, but it is preferably attached instead to a vertical support bar 28 forming part of the chassis of computer 22. The chassis includes many such bars 28, evenly spaced along the edges of cards 18, or provided at specific locations. The position of frame 14 corresponds to the position of housing 12 when card 18 is fully inserted into brackets (not shown) which support cards 18 and are attached to bars 28. Attachment of frame 14 to bar 28 facilitates removal of the circuit card from the computer, as discussed further below. Mounting flanges 30 and 32 (also seen in FIG. 3) are laterally offset to allow the flanges of adjacent frames 14 to overlap and thus save space, similar to the flanges provided on the prior art electrical connectors mentioned hereinafter. A tongue-and-groove arrangement is formed by notches 34 in the sidewalls of frame 14 and splines 36 on plug 16, to allow plug 16 to slide within frame 14, and to ensure proper alignment of plug 16 in frame 14. Plug 16 may also be mechanically polarized, for example, by indenting the lower portions 38 of side walls 40 of plug 16. FIG. 8 illustrates the two-part construction of plug 16. Housing 12, frame 14, and plug 16 may be constructed of any durable material, preferably an injection-molded polymer such as polyester liquid crystal polymer (LCP).

Figure 3:
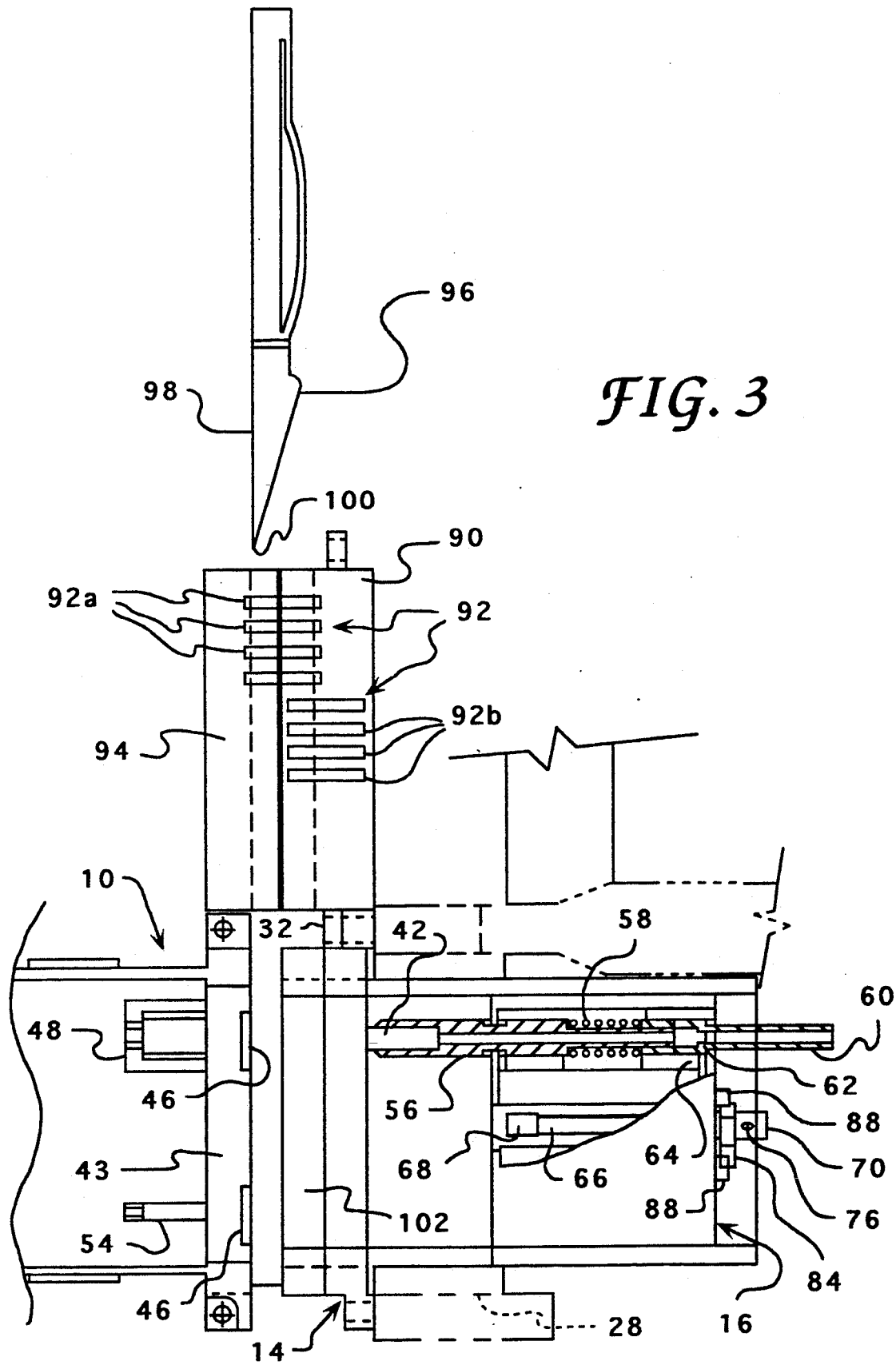
FIG. 3 is a top plan view of the edge of a circuit card having several connectors of the present invention, with a partial cutout revealing a ferrule assembly, and further illustrating the use of a sliding actuation tool.

With further reference to FIG. 3, plug 16 includes a plurality of ferrules 42 (preferably ceramic) which contain the terminal ends of optical fibers 24. Housing 12 has an alignment block 43 along one edge thereof and plurality of holes 44 in block 43 extending generally perpendicular to the edge of housing 12, and ferrules 42 are positioned on plug 16 whereby they are generally aligned with holes 44. Holes 44 are advantageously provided with removable sleeves or bushings 46 which receive ferrules 42, and are adjustable for active alignment to an optoelectronic device 48 which is located in housing 12. Bushings 46 may be chamfered to facilitate insertion of ferrules 42. The connection between the ferrules and the optoelectronic components may be accomplished in several different ways. For example, device 48, which may have an internal lens to directly couple to ferrule 42, is shown forcibly abutting ferrules 42; this arrangement is particularly suited for multimode applications. In an alternative design, another electro-optical device 5o has "pigtail" sections of fiber 52 terminating in other ferrules 54 which couple to ferrules 42 of plug 16; this arrangement is particularly suited for single mode applications. The optically active devices 48 and 52 may comprise any conventional optoelectronic components, including light-emitting diodes (LED's), laser diodes, photodetectors, etc. Presently preferred components include the laser diodes and photodetectors currently sold by British Telecommunications & DuPont Technologies of Kenntt Square, Pennsylvania, under part numbers LSC1300 and PDT0412, respectively.

It will be noted that connector 10 may be designed for practically any number of fiber connections; for example, FIG. 1 shows a 4-plex connector, while FIG. 3 shows a duplex connector. In any configuration, the ferrule assembly is preferably pull proof. This is accomplished in the present invention by providing a ferrule assembly which includes a ferrule 42, a ferrule holder or collar 56, a spring 58, and a ferrule tailpiece or nut 60. The cable portion of a given fiber 24 is secured to tailpiece 60, such as by bonding or crimping. The fiber extends through tailpiece 60 and collar 56, terminating in ferrule 42. Tailpiece 60 has an annular flange 62 which serves as a stop to limit rearward movement of the ferrule assembly by abutting the inner rear wall 64 of plug 16. In this manner, any pulling force transmitted through the fiber optic cable is transferred to tailpiece 60 and the plug housing. Ferrule collar 56, which is spring-loaded against the proximate end of tailpiece 60, is thus unaffected. The ferrule collar and tailpiece are preferably constructed of polyetherimide.

Figure 4:
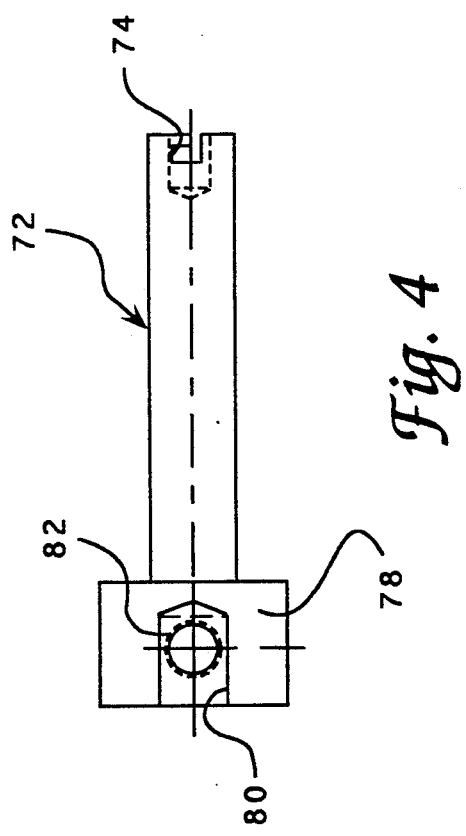
FIG. 4 is a side elevational view of the tool used to twist the torsion latch member provided in one embodiment of the present invention.

FIG. 3 also illustrates the use of a torsion latch member 66 which is used to releasably secure plug 16 in one or more positions relative to frame 14. Torsion member 66, which is constructed of a flexible, resilient material such as polyetherimide, has a boss or anchor 68 at one end which is fixed to the housing of plug 16. The free end 70 of torsion member 66 is provided with an appropriate structure to allow twisting of that end of member 66. While end 70 may be designed to mate with practically any tool, such as a screwdriver, it is preferably designed to mate with a special tool such as that shown in FIG. 4. Tool 72 has a tubular construction and bayonet-style cutouts 74 at one end which serve to catch pins 76 on end 70 of torsion member 66. The other end of tool 72 is provided with an adaptor head 78 having a hole 80 and a retaining screw 82 so that it may easily be attached to, e.g., a regular screwdriver. Tool 72 is preferably constructed of polyetherimide or metal.

Torsion member 66 releasably fixes plug 16 to frame 14 by providing a tenon or tab 84 which fits into one or more slots 86 in the base Of frame 14 (see FIG. 1). In the relaxed state of member 66, tab 84 extends downwardly into one of these slots, but the tab is easily disengaged by twisting free end 70. When tab 84 is so disengaged, plug 16 is free to slide along frame 14. Stop blocks 88

(seen more clearly in FIG. 8), are integrally molded with plug 16 to limit the degree to which member 66 may be twisted. The use of such a releasable latching mechanism having more than one setting or position is advantageous in that connector 10 may be placed in an inoperative state, but plug 16 is still retained with the entire connector assembly in a retracted or storage position. This facilitates the removal of circuit card 18 while retaining plug 16 in position for quick reconnection. Provision of pins 76 and bayonet-style tool 72 makes it easy to move plug 16 between the operative and retracted positions and, furthermore, since most prior art fiber optic connectors require manual actuation to achieve the connection, the use of tool 72 overcomes the difficulty of disengaging the connectors in a high-density environment where many connectors may be spaced so closely as to preclude manual access.

FIG. 3 further depicts the optional use of a shuttle system which is compatible with one particular prior art computer card using copper connectors 90 to provide electrical connections via wires 91. Connectors 90 have multiple sliding contacts 92, such as the connector sold by International Telephone and Telegraph Co. under part no. 8911-263. This electrical connector has a notch on one side forming a U-shaped profile, and the contacts are free to slide from side-to-side within the notch. When the contacts are in a first position 92a, one end of each contact extends slightly beyond the connector to touch a contact of another electrical connector 94 on the circuit card. In the second position 92b, the contacts are retracted, opening the circuit paths and physically disengaging connector 90 from the circuit card. Contacts 92 are moved from one position to another using an elongated actuator tool 96 similar to an oil pan dipstick. The terminal end 98 of tool 96 forms an inclined ramp having a narrow tip 100. Each of the contacts 92 have a small tab that extends into the notch of connector 90 and, as tool 96 is inserted into the notch, it forcibly urges the tabs to one side or another, depending upon the orientation of tool 96. Thus, a bank of connectors 90 may be quickly disengaged by simply pushing tool 96 through each of the connectors 90 on a given card 18.

Figure 5:
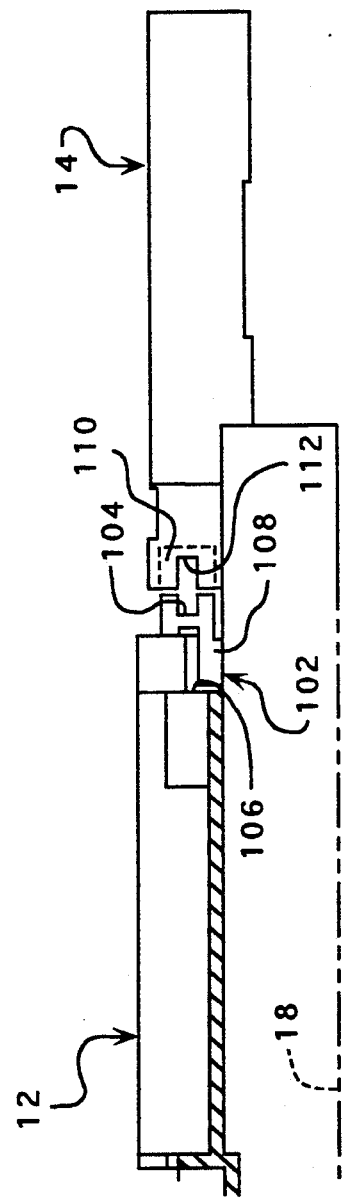
FIG. 5 is a side elevational view of the card mounted connector shown in FIG. 3, further depicting the shuttle interposed between the plug and transceiver housing.

The fiber optic connector of the present invention may be made compatible with such a prior art copper connection system by simply providing a space or channel between the housing 12 and frame 14. There is, however, one major problem with such a design, relating to the fact that there is not much tolerance in the position of tip 100 with respect to the connector contacts 92. If such an open space is provided between housing 12 and frame 14, then terminal end 98 of tool 96 can have some freedom in lateral movement, meaning that tip 100 might not be properly oriented for another copper connector which follows connector 10. It is very likely that a computer circuit card utilizing the present invention would have such side-by-side copper and fiber connectors. In other words, tip 100 might jam against or damage the tab of the first contact 92 in any copper connector 90 which is adjacent to a fiber connector 10. In order to maintain the proper alignment of tool 96, the present invention provides a slider or shuttle 102 as shown in FIG. 5. Shuttle 102 is slidably interposed between housing 12 and frame 14, and has two grooves for receiving tool 96, forming an H-shaped profile having a central bar 104. Bar 104 has several holes therein, to allow passage of ferrules 42. In the embodiment of FIG. 5, the edge of housing 12 forms a shelf 106 to accommodate the base 108 of shuttle 102; the edge of frame 14 has a cavity 110 for receiving a portion of shuttle 102, and the sides of frame 14 have a notch 112 to allow passage of tool 96.

When it becomes necessary to remove a card 18 from the chassis of a computer having copper connectors 90, each of the fiber optic Connectors 10 are first disengaged by using tool 72 to move each of the plugs 16 to their storage positions; this action retracts ferrules 42 from the shuttle area. Tool 96 is used to disconnect copper connectors 90, and the card may then be withdrawn from the chassis. This shuttle arrangement therefore complements the prior art copper connection system by providing a fiber connector which may be placed along side the copper connectors without impairing the quick disconnect function of tool 96.

Figure 6:
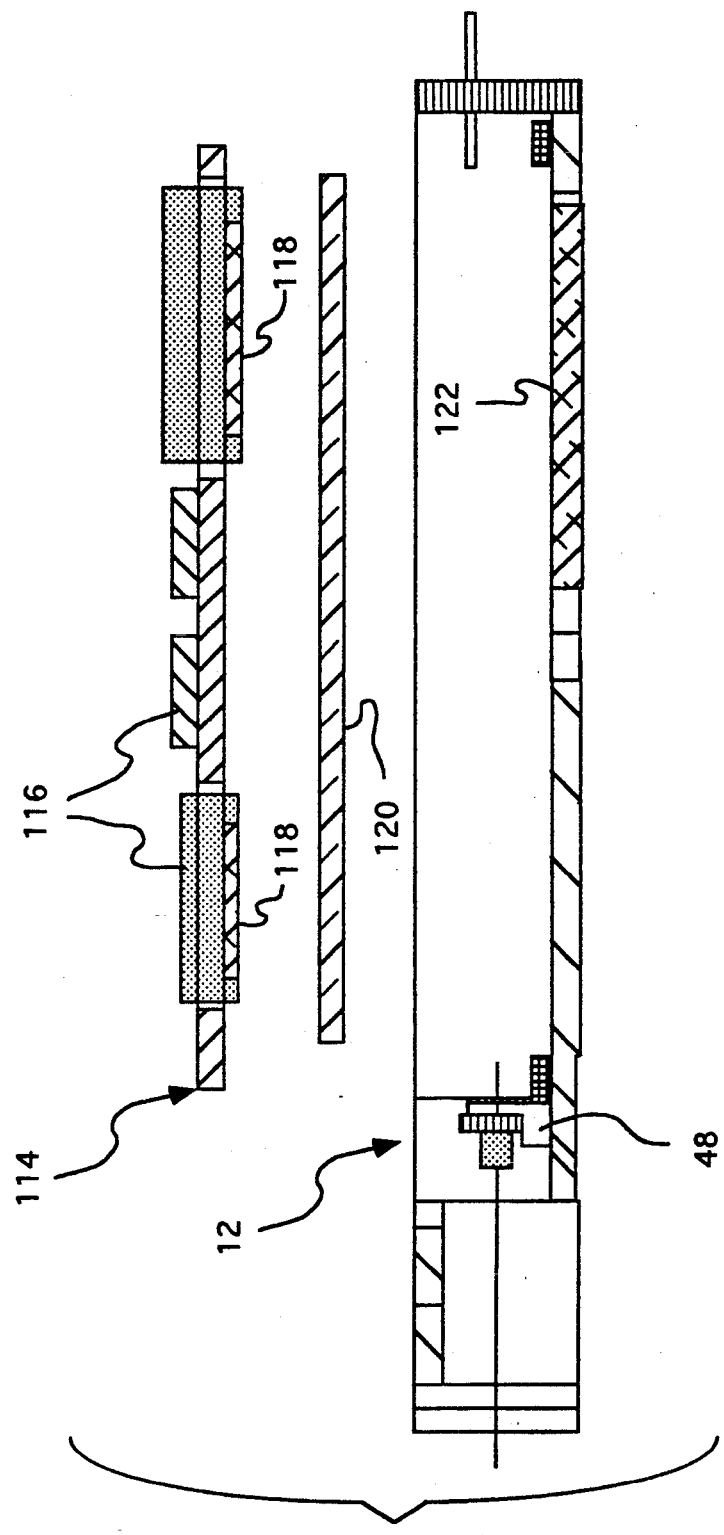
FIG. 6 is a side elevational view of the transceiver housing with an exemplary optoelectronic circuit board shown removed from the housing.

Referring now to FIG. 6, in accordance with the goal of providing a low-profile connector, the optoelectronics package located in housing 12 should have a minimal height. The presently preferred package design shown in FIG. 6 includes a substrate or printed circuit board (PCB) 114 which has discrete surface mount (electronic) components 116 attached to each side thereof. Metallic (aluminum) studs 118 may be provided for heat dissipation, and PCB 114 may be mounted to housing 12 using thermal transfer tape 120. The floor of housing 12 may also include a thermal stud 122. PCB 114 preferably is a multilayer fiberglass substrate having impedance controlled signal paths for high frequency performance, a woven ground and voltage plane design for improved thermal dissipation, and cavities for ultra-low profile surface mount application.

Figure 7:
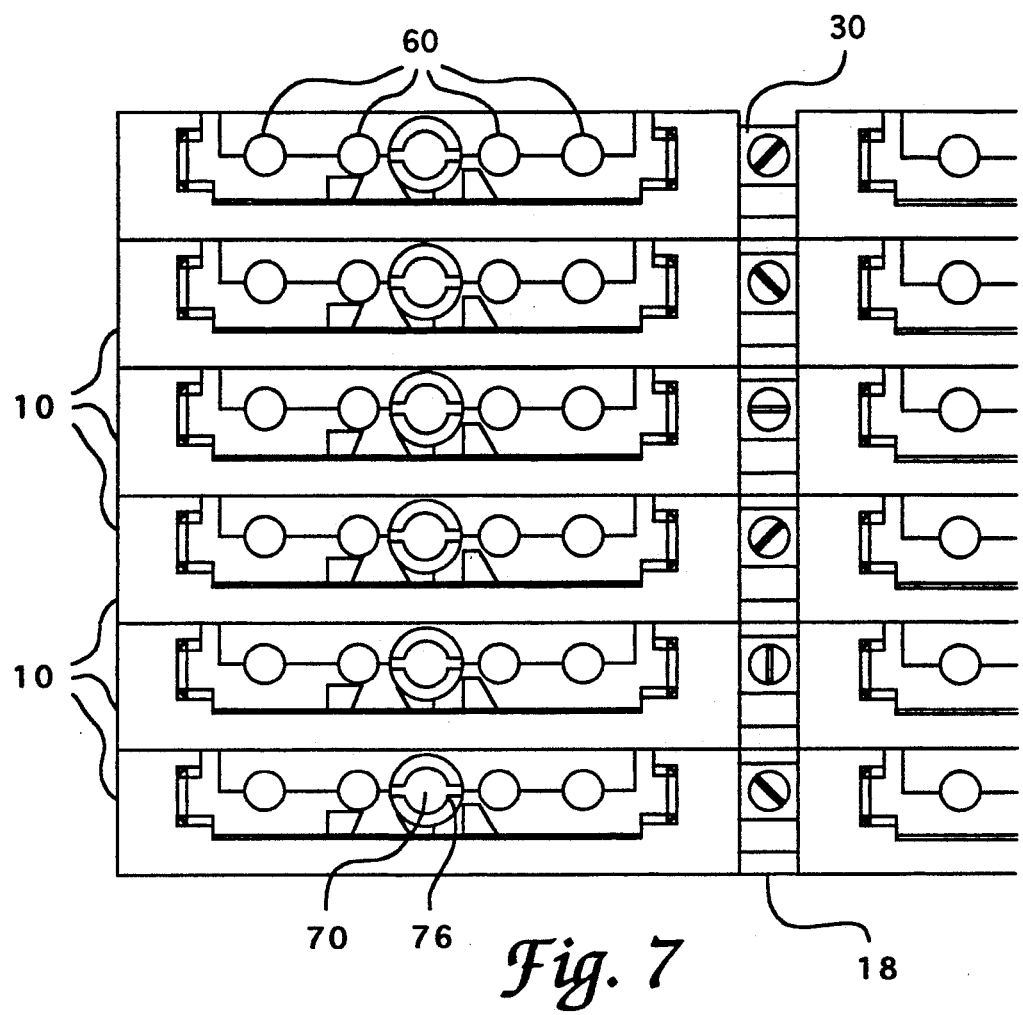
FIG. 7 is a front elevational view of a plurality of connectors mounted side by side and in a stacked relationship to achieve high-density interconnection.

While the dimensions of connector 10 may vary considerably depending upon the application, the primary goal of the present invention is to provide a low-profile connector, having a thickness in the range of 2–8 mm, and preferably about 5 mm, in order to be compatible with existing computer systems wherein the spacing between circuit cards is about 6 mm. The width of connector 10 primarily depends upon the number of ferrules in plug 16; in an exemplary 4-plex connector, each of the transceiver housing 12, frame 14, and plug 16 have a width in the range of 20–40 mm, preferably about 30 mm. PCB 114 is very thin, about 2 mm thick. Due to the overall compactness of the design, combined with overlapping flanges 30 and 32, very high interconnection densities can be achieved. FIG. 7 illustrates how a plurality of connectors 10 may be mounted side by side and in a stacked relationship to achieve high-density interconnection. Densities of more than 1 connection per square centimeter, and as high as 2 connections per square centimeter, can be achieved, compared to 0.6 connections per square centimeter for conventional connectors. A ferrule-to-ferrule distance of as little as 2 mm can also be achieved.

Figure 9:
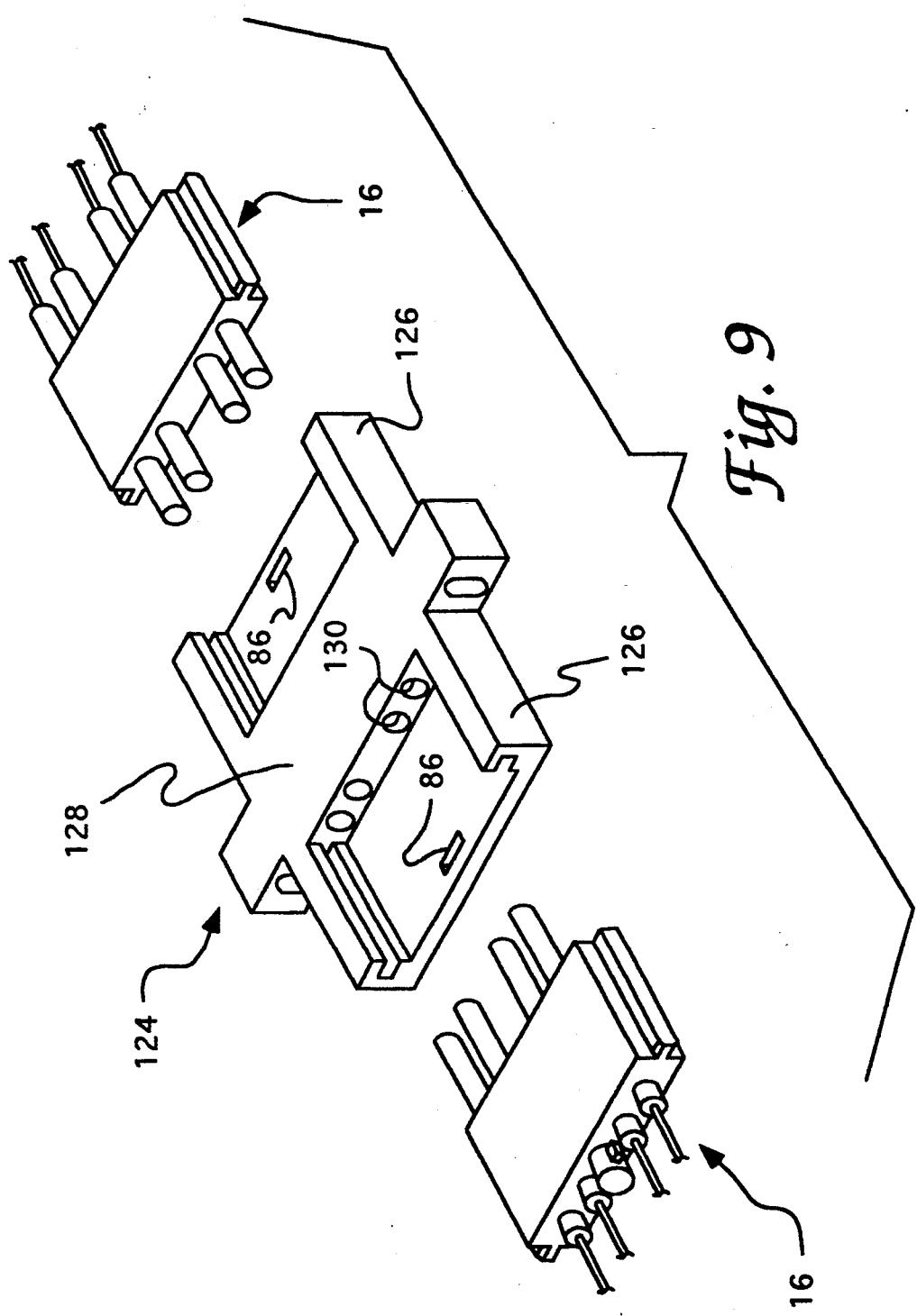
FIG. 9 is a perspective view of the fiber-to-fiber connector of the present invention.

Those skilled in the art will appreciate that, after installation of an interconnection system in accordance with the present invention, it may become necessary to re-route certain connections within the data processing system. FIG. 9 illustrates how the connector 10 of the present invention may easily be adapted for fiber-to-fiber interconnection, facilitating such re-routing. Two existing plugs 16 may be interconnected by providing a coupling or receptacle 124 having two porches or ramps 126 which are essentially identical to frame 14. A boss or block 128 joins ramps 126, and has several holes 130 therein for receiving the ferrules. A bulkhead for many such fiber-to-fiber connections may be formed by stacking several such receptacles 124.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that the appended claims will cover such modifications that fall within the true scope of the invention.

We claim:

1. An optoelectronic connector comprising:
    a housing having an edge;
    an optoelectronic component attached to said housing, having an optically active end located proximate said edge;
    plug means having a ferrule member, for terminating an end of an optical fiber inside said ferrule member, said plug means including a body having two generally parallel side walls, each of said side walls having a spline; and
    frame means for slidably receiving said plug means and for aligning said ferrule member with said optically active end of said optoelectronic component, said fame means having side walls with grooves therein for receiving said splines, and said frame means, plug means and housing each having a thickness of about 5 mm or less.

2. The connector of claim 1 wherein said plug means further includes means for mechanically polarizing said plug means with respect to said frame means.

3. The connector of claim 1 wherein said plug means further includes latch means for releasably retaining said plug means in said frame means in a first, operative position and in a second, retracted position.

4. The connector of claim 1 further comprising shuttle means interposed between said housing and said frame means, for maintaining the orientation of a tip of an elongated actuator tool which may be pushed between said housing and said frame means.

5. The connector of claim 1 wherein:
    said housing has an alignment block at said edge, said block having a hole passing therethrough;
    said hole has a bushing therein; and
    when said plug means is inserted in said frame means, said ferrule member passes through said bushing.

6. A device for interconnecting an optical fiber and an electronic component, comprising:
    a generally planar substrate supporting the electronic component;
    optoelectronic means, mounted to said substrate and connected to the electronic component, for converting an optical signal to an electrical signal;
    plug means having an alignment member, for terminating an end of the optical fiber in said alignment member;
    means for optically coupling said alignment member to said optoelectronic means;
    frame means for receiving said plug means and aligning said alignment member with said coupling means; and
    latch means for releasably retaining said plug means in said frame means in a first, operative position and in a second, retracted position.

7. The device of claim 6 further comprising:
    a housing mounted to said substrate, said optoelectronic means being contained in said housing; and
    shuttle means interposed between said housing and said frame means, for maintaining the orientation of a tip of an elongated actuator tool which may be pushed between said housing and said frame means.

8. The device of claim 6 wherein said frame means and plug means each have a thickness of about 5 mm or less.

9. The device of claim 6 further comprising a housing attached to said substrate, said optoelectronics means being contained in said housing, and said housing having an alignment block having a hole therein, and wherein:
    said alignment member is a first alignment member which is inserted in a first end of said hole when said plug means is in said operative position;
    said optoelectronic means includes an optically active end; and
    said coupling means includes a pigtail optical fiber having first and second ends, said first end being optically connected to said optically active end of said optoelectronics means, and said second end terminating in a second alignment member inserted in a second end of said hole.

10. The device of claim 6 wherein:
    said frame means includes a base having first and second slots therein, corresponding to said first and second positions;
    said plug means includes a plug body having first and second ends; and
    said latch means includes a torsion member constructed of a resilient, flexible material, having first and second ends, said first end of said torsion member being fixed to said plug body proximate said first end thereof, and said second end of said torsion member being located proximate said second end of said plug body and having a tab for insertion into said slots.

11. The device of claim 10 wherein said second end of said torsion member further has means for twisting said second end of said torsion member.

12. A fiber optic connector comprising:
    a generally planar substrate having an edge;
    a housing mounted to said substrate, having an edge which is generally parallel with and adjacent to said edge of said substrate, said housing having an alignment block located at said edge thereof, and having a plurality of holes extending through said alignment block in a direction generally perpendicular to said edge of said housing;
    a plug having a body, a plurality of ferrules, and means for attaching said ferrules to said body, each of said ferrules containing a terminal end of one of a plurality of optical fibers;
    frame means for receiving said plug and for aligning said ferrules with said holes in said housing; and
    shuttle means interposed between said housing and said frame means, for maintaining the orientation of a tip of an elongated actuator tool which may be pushed between said housing and said frame means.

13. The connector of claim 12 wherein said shuttle means comprises a shuttle member slidably attached to said housing, having a length which is generally equal to the length of said edge of said housing, and having an H-shaped cross-section forming two notches, each notch having a width which is approximately equal to the thickness of the actuator tool.

14. The connector of claim 12 further comprising at least one electrical connector pair including:

a first electrical connector attached to said edge of said substrate; and a second electrical connector releasably attached to said first electrical connector, said second electrical connector having a notch adjacent said first electrical connector and a plurality of contacts slidably mounted in said second connector, each said contact being electrically connected to one of a plurality of wires and having a tab extending into said notch.

15. The connector of claim 12 further comprising latch means for releasably retaining said plug in said frame means in a first, operative position and in a second, retracted position.

16. The connector of claim 12 wherein said housing, plug, frame means and shuttle means each have a thickness of about 5 mm or less.

17. An optoelectronic connector comprising:

a housing having an edge;

a plurality of optoelectronic components attached to said housing, each having an optically active end located proximate said edge;

plug means having a plurality of ferrule members, for terminating ends of optical fibers inside said ferrule members; and frame means for slidably receiving said plug means and for aligning said ferrule members with said optically active ends of said optoelectronic components, said frame means, plug means and housing each having a thickness no greater than about 8 mm.

18. The connector of claim 17 wherein said frame means, plug means and housing each have a thickness of about 5 mm or less.

19. The connector of claim 17 wherein said plug means provides an interconnection density of said ferrules of at least 1 connection per square centimeter.

20. The connector of claim 17 wherein said plug means includes a body having two generally parallel side walls, each of said side walls having a spline, and said frame means has side walls with grooves therein for receiving said splines, and further comprising latch means for releasably retaining said plug means in said frame means in a first, operative position and in a second, retracted position.

21. A system for connecting wires and optical fibers to a plurality of electronic components located on a circuit card in a data processing system, comprising:

at least one electrical connector pair including a first electrical connector attached to an edge of the circuit card, and a second electrical connector releasably attached to said first electrical connector, said second electrical connector having a notch adjacent said first electrical connector, a plurality of contacts slidably mounted in said second connector, and each said contact being electrically connected to one of the wires and having a tab extending into said notch;

an elongated actuator tool having a pointed tip and sized to fit in said notch of said second electrical connector;

at least one fiber optic connector including a housing, a plug, a frame and a shuttle, said housing being mounted to the edge of the circuit card adjacent said first electrical connector, having an alignment block located at an edge of said housing generally parallel with and adjacent to the edge of the circuit card, and having a plurality of holes extending through said alignment block in a direction generally perpendicular to said edge of said housing, each said hole having a removable bushing therein, said plug comprising a body, a plurality of ferrules, and means for attaching said ferrules to said body, said body having two sidewalls each having a spline, each of said ferrules containing a terminal end of one of the optical fibers and being aligned with said bushings in said housing, and said attaching means including means for transferring pulling forces from the optical fiber to said plug body, said frame having a base, two side walls, and means for mounting said frame to a support member, said side walls having grooves therein for receiving said splines of said plug body, and said base having a plurality of slots therein for receiving said tab of said torsion member, said shuttle being interposed between said housing and said frame, having a length which is generally equal to the length of said edge of said housing, and having an H-shaped cross-section forming two notches, each notch having a width which is approximately equal to the thickness of said actuator tool; and a plurality of optoelectronics means, located in said housing proximate said holes therein, for converting optical signals into electrical signals.

22. An optoelectronic connector comprising:

a housing having an edge, and an alignment block located at said edge, said block having a hole passing therethrough and said hole having a bushing therein;

an optoelectronic component attached to said housing, having an optically active end located proximate said edge;

plug means having a ferrule member, for terminating an end of an optical fiber inside said ferrule member; and frame means for slidably receiving said plug means and for aligning said ferrule member with said optically active end of said optoelectronic component, said ferrule member passing through said bushing when said plug means is inserted in said frame means.

* * * * *